United States Patent [19]
Oku

[11] Patent Number: 5,898,481
[45] Date of Patent: Apr. 27, 1999

[54] PHOTOGRAPH PROCESSING DEVICE

[75] Inventor: Hiroshi Oku, Wakayama, Japan

[73] Assignee: Noritsu Koki Co., Ltd., Wakayama, Japan

[21] Appl. No.: 08/731,978

[22] Filed: Oct. 23, 1996

[30] Foreign Application Priority Data

Oct. 25, 1995 [JP] Japan .................................... 7-278104
Oct. 25, 1995 [JP] Japan .................................... 7-278105
Oct. 25, 1995 [JP] Japan .................................... 7-278107

[51] Int. Cl.⁶ .................................................. G03B 27/52
[52] U.S. Cl. .............................. 355/75; 396/515; 396/284
[58] Field of Search ................................. 355/40, 41, 75, 355/76; 396/284, 594, 595, 599, 409, 410, 515, 512, 387, 207; 242/554.5

[56] References Cited

U.S. PATENT DOCUMENTS

| | | | |
|---|---|---|---|
| 4,761,675 | 8/1988 | Sawasaki | 355/76 |
| 4,994,850 | 2/1991 | Imamura et al. | 355/41 |
| 5,596,381 | 1/1997 | Murakami et al. | 396/387 |
| 5,614,971 | 3/1997 | O'Leary | 396/409 |
| 5,614,986 | 3/1997 | Yoshikawa et al. | 355/75 |
| 5,621,496 | 4/1997 | Yoshikawa et al. | 355/75 |

FOREIGN PATENT DOCUMENTS

37 28 516 3/1988 Germany.

OTHER PUBLICATIONS

Patent Abstracts of Japan, vol. 096, No. 002, Feb. 29, 1996 & JP 07 270938 A (Noritsu Koki Co. Ltd.), Oct. 20, 1995, Abstract.
Patent Abstracts of Japan, vol. 9, No. 116(P–357), May 21, 1985 & JP 60 003666 A (Fuji Xerox), Jan. 10, 1985, Abstract.
Patent Abstracts of Japan, vol. 014, No. 452 (P–1112), Sep. 27, 1990 & JP 02 181134 A (Fuji Photo Film Co. Ltd.), Jul. 13, 1990, Abstract.

*Primary Examiner*—D. Rutledge
*Attorney, Agent, or Firm*—Wenderoth, Lind & Ponack, L.L.P.

[57] ABSTRACT

A photograph processing device includes an automatic negative mask section having a film slot and a cartridge setting unit at the film slot. A guide guides a film separated from a cartridge into the film slot. The guide is removably attached to the cartridge setting unit. The guide is attached to a periphery of the cartridge setting unit by a hinge to be integral therewith.

13 Claims, 10 Drawing Sheets

Fig.13
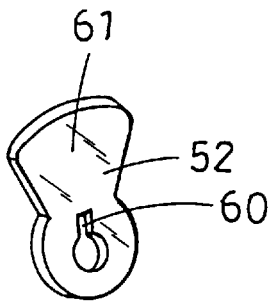
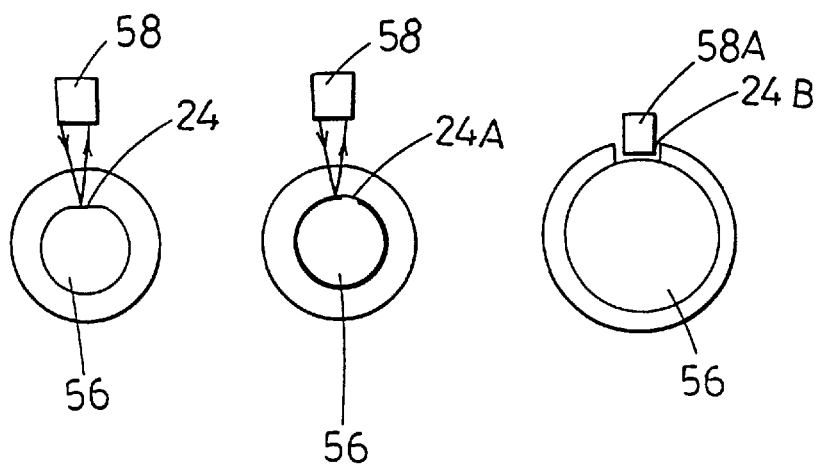
Fig.14(a)  Fig.14(b)  Fig.14(c)

PHOTOGRAPH PROCESSING DEVICE

BACKGROUND OF THE INVENTION

This invention relates to improvements in a photograph processing device.

In recent years, a new type of film 20 (FIG. 16) has been proposed which premises that the film is always used while being connected to a spool axis C1 of a cartridge 1 except at the time of a development process. To position this type of film 20 in an automatic negative mask section of a photograph processing device to print the film, a negative mask section 60 including a cartridge setting unit 61 with a thrust mechanism, as shown in FIG. 15, becomes necessary. However, it may be more efficient in some cases for flow of processing operations in photograph shops or equivalent to use a film 20A stripped from but not yet connected to the cartridge (hereinafter referred to as a strip film) in the film printing process following completion of film development. However, such use involves a problem that when the strip film 20A is fed into the negative mask section 60 as shown in FIG. 15, the thrust mechanism hinders the strip film 20A from entering a film slot 62 at the negative mask section 60, and the film can be scratched.

To avoid such problem, a negative mask section 70, which is designed solely for the strip film with the cartridge setting unit 61 omitted, as shown in FIG. 16, becomes necessary. This causes the problem of a burden of spending for new equipment on photograph shops. Further, it may be attempted to use the negative mask section 70 designed solely for the strip film for the processing of the film 20 contained in the cartridge 1. However, this type of negative mask section 70 is not provided with a thrust mechanism, so that it cannot feed the film 20 into a film slot 71. If only a front end of the film 20 is pulled out by hand from the cartridge 1 to be fed into the film slot 71, since a rear end of the film 20 is connected to the spool axis C1 of the cartridge 1, resistance to movement of the film 20 will increase the risk of damage to the film 20.

The following additional problems exist.

Currently marketed film is such that after being removed from a cartridge during a film development process and singly printed, the film is maintained in custody in a special bag. A new type of film proposed recently can be re-contained in and maintained in custody in an original cartridge after completion of a development process. Where the new type of film is printed via the automatic negative mask section, the film can be removed from the cartridge to be singly printed in the same way as the known type of film. However, this requires a troublesome operation of removing the film from the cartridge. Thus, efficiency is poor. Also, at the time of the removal of the film from the cartridge, the film is touched by hand and thereby is smudged. Further, where the film is printed while remaining connected to the cartridge, the cartridge must be set at a correct position to a negative guide slot at the negative mask section. Otherwise, the film will be damaged by deviation of the cartridge from the slot. if the width of the cartridge setting unit is equal to the width of the cartridge in order to precisely set the cartridge in the cartridge guide slot, efficiency of the operation of setting the cartridge is worsened.

Further, there are still other problems as follows.

In recent years, a new system for the film to be treated in the cartridge has been proposed. The cartridge of this system, in which some indication windows are formed on a side wall of the cartridge and an indication plate is installed at the inside of the side wall, has the function of indicating a status of film packed in the cartridge (unexposed, exposed, developed, etc.), which status can be visually checked by the indication plate being aligned with a particular turned over the indication window. In the photograph processing device for handling this type of cartridge, after the film is pulled from the cartridge and is processed, it must be rewound into the original cartridge. If the indicative function is not controlled accurately according to a state of film in the cartridge so that a correct state of the film is indicated, various types of problems will arise.

For example, if after a cartridge with all frames of the film already exposed but not yet developed is processed by a developing device, and the indicator is not controlled so that the state of film can be changed from "Not-yet-developed" to "Already-developed", there is a risk that the film may be developed again by mistake. On the other hand, if the indicative function is erroneously controlled so that all frames are indicated as being in the state of "Not-yet-exposed", there is a risk that the cartridge may be mistaken for an unused one and be inserted in a camera to result in failure of taking valuable photos.

The purpose of the invention is to solve these problems. An object of the invention thus is to provide a photograph processing device which enables a strip film to fed into a film slot without being hindered by a cartridge setting unit.

Another object of the invention is to provide a photograph processing device which can facilitate not only placement and removal of a cartridge in and from a fixed location but also a film printing process, whereby only a simple positioning of the cartridge is necessary and the need to pull the film manually from the cartridge is eliminated, thereby to provide improved workability and also to avoid a possible risk of the film being scratched.

A further object of the invention is to provide a photograph processing device which enables an indicative function to be precisely selected to eliminate the above possible risks.

SUMMARY OF THE INVENTION

A photograph processing device according to the invention includes an automatic negative mask section having a film slot and a cartridge setting unit at the film slot. A guide guides a film separated from a cartridge into the film slot, the guide being removably attached to the cartridge setting unit. The guide may be attached to a periphery of the cartridge setting unit by a hinge to be integral therewith.

The photograph processing device according to the invention may include a film holder for an automatic negative mask section, the film holder having holding blocks for holding the cartridge. The blocks are located at opposite lateral sides of the cartridge, are spaced apart from each other and are adapted to be movable toward and away from each other. The blocks have retaining shafts which are provided at fixed positions of the holding blocks to be engageable into engaging holes at a spool axis of the cartridge, whereby the cartridge can be retained by the retaining shafts. The retaining shafts at the holding blocks may be constructed such that one retaining shaft is freely rotatable, is always biased toward the other retaining shaft by resilience of a spring, is provided at a front end portion thereof with a key which is engageable into a key slot formed in the engaging hole at the spool axis of the cartridge, and is driven by a driving device. The one retaining shaft driven by the driving device may have an inner channel communicating with an opening formed at a circumferential part of the retaining shaft in the vicinity of the front end thereof. A resilient projection member is provided in the inner channel and has a retaining projection projecting from the opening and detachably engageable into the key slot formed in the engaging hole at the spool axis of the cartridge.

Further, a photograph processing device according to the invention may include a rotary driving device constructed such that a driving shaft, which is to be inserted in a spool of a cartridge having an indication plate rotatable together with the spool, is rotatively driven by rotary driving means to pull out and take up the film from and in the cartridge. The indication plate is stopped at selected angular positions to indicate the state of film. The rotary driving device includes a position detecting means for outputting a detection signal when the indication plate is positioned in a selected angular position, and a control means for controlling the rotary driving means, when the detection signal is output, to stop the indication plate at the selected angular position. The position detecting means may be a single optical mark formed at a fixed angular position on a periphery of the driving shaft, and an optical sensor for optically detecting a position of the optical mark and outputting the detection signal, when the indication plate is in a selected angular position.

BRIEF DESCRIPTION OF THE DRAWINGS

FIG. 13 is a perspective view of an indication plate provided at the cartridge;

FIGS. 14(a)–14(c) are illustrations showing various kinds of constructual examples of an optical sensor;

DETAILED DESCRIPTION OF THE PREFERRED EMBODIMENTS

Embodiment 1

Figure 1:
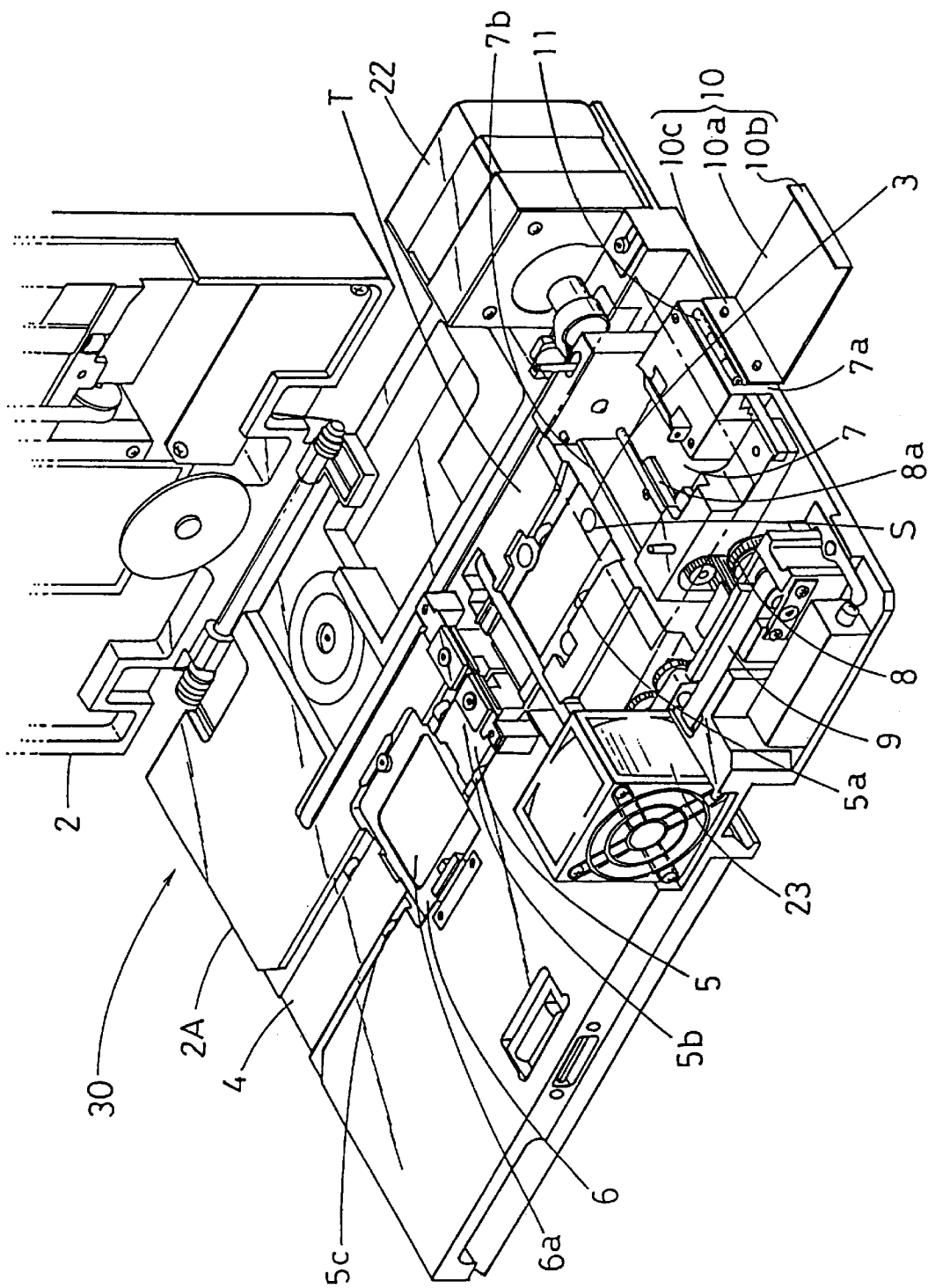
FIG. 1 is a perspective view of an embodiment of a negative mask section of an automatic photograph processing device.

A negative mask section 30 of an automatic photograph processing device comprises a film insertion slot 3 and a film ejection slot 4 which are provided at frames 2, 2A connected to each other in such a manner as to freely open and close. A carriage path 5 is provided in the frames 2, 2A, and a film 20 contained in a cartridge 1 or a strip film 20A is carried along path 5 from the film insertion slot 3 to the film ejection slot 4. A negative mask 6 and a scanner are provided along the carriage path. Parts of the negative mask section 30 are controlled by a controller.

The negative mask 6 has an aperture 6a located on optic axes of exposing light. The scanner detects information of a photographic image of each frame of film 20, 20A.

Along the carriage path 5 are provided pairs of rollers 5a, 5b, 5c, which are so designed as to be rotatively driven by a motor 22 in synchronization with one another through a transmission means T. On the carriage path 5 near the film insertion slot 3 is provided a sensor S for detecting a front end of each film 20, 20A to drive the pairs of rollers 5a, 5b, 5c.

A cartridge setting unit 7 is provided before the film insertion slot 3 and is equipped with a thrust mechanism 8. The thrust mechanism 8 is provided with a spool rotating shaft 8a which is engageable with a spool axis of the cartridge 1 to rotate a spool and is designed such that the film 20 can be pulled out from the cartridge 1 by normal rotation of the spool rotating shaft 8a and taken up in the cartridge 1 by reverse rotation of the spool rotating shaft 8a. The spool rotating shaft 8a is rotatively driven via a transmission mechanism 9 and a motor 23.

Figure 2:
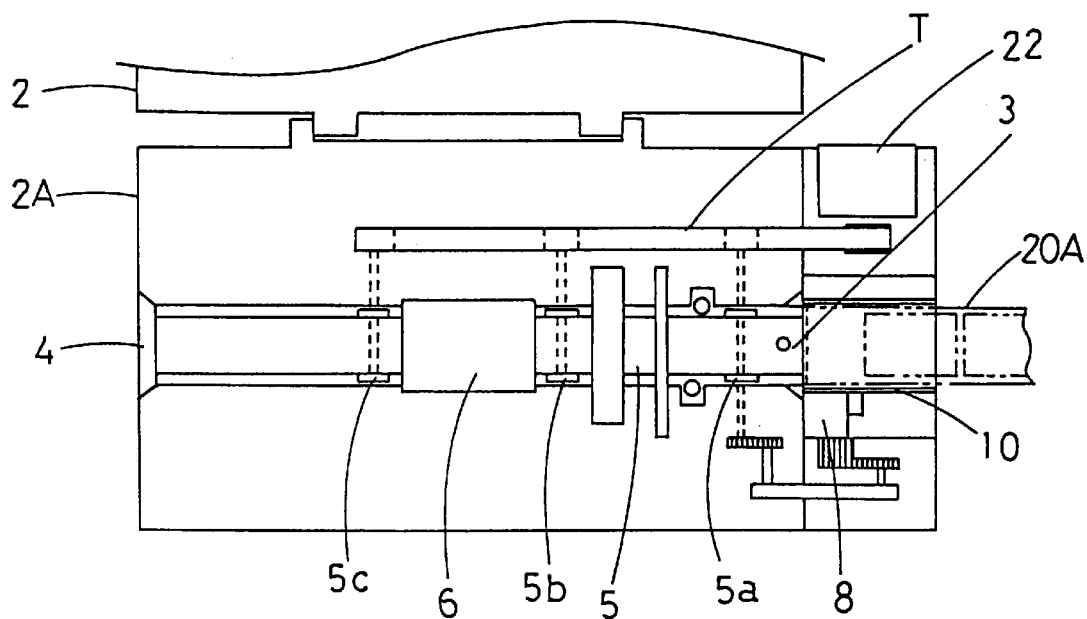
FIG. 2 is a plan view showing a feeding movement of a strip film in such embodiment.
Figure 3:
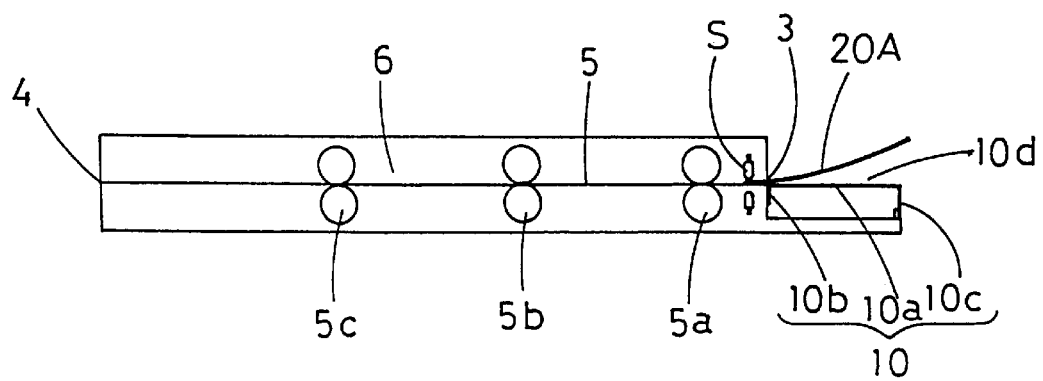
FIG. 3 is a sectional side elevation view showing the feeding movement of the strip film.
Figure 4:
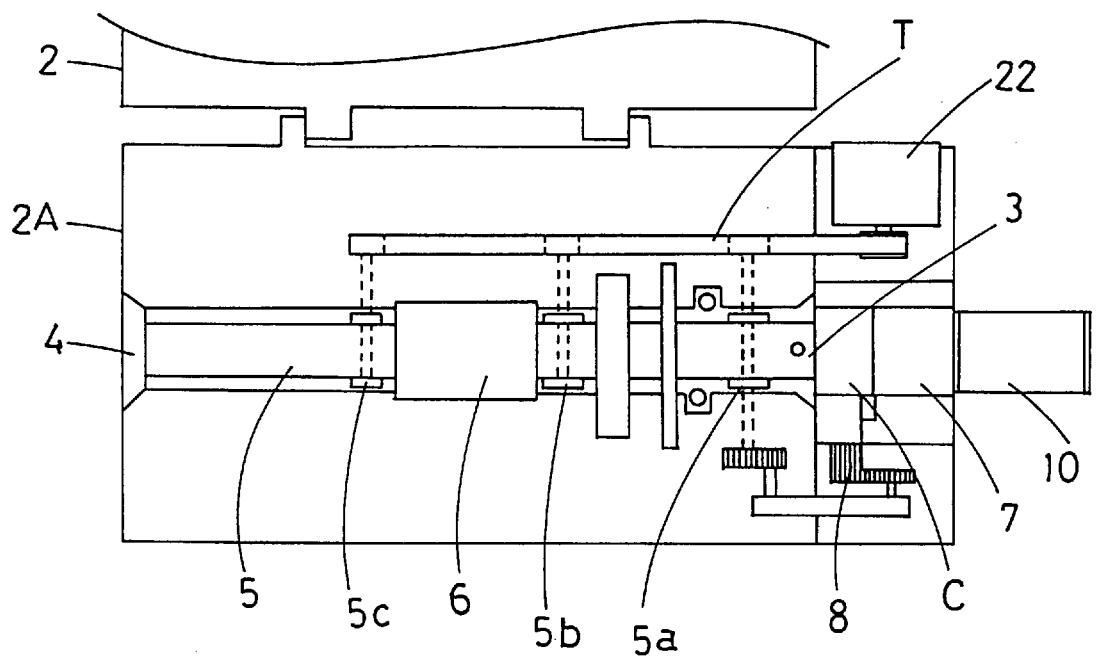
FIG. 4 is a plan view showing a feeding movement of a film contained in a cartridge in such embodiment.
Figure 5:
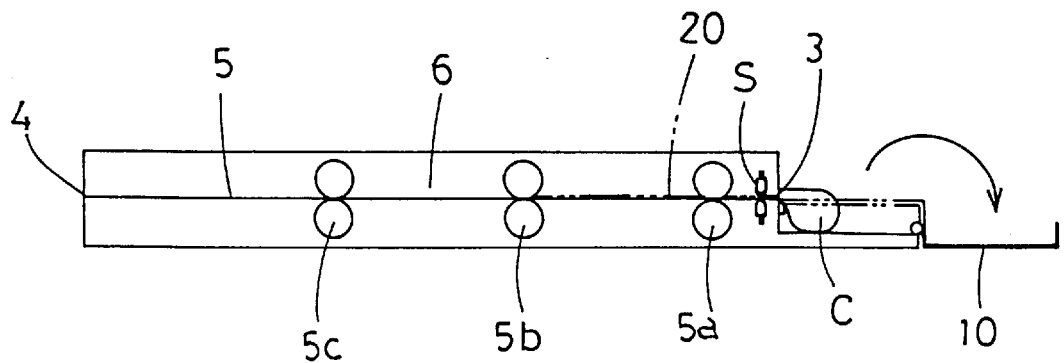
FIG. 5 is a sectional side elevation view showing the feeding movement of the film contained in the cartridge.
Figure 6:
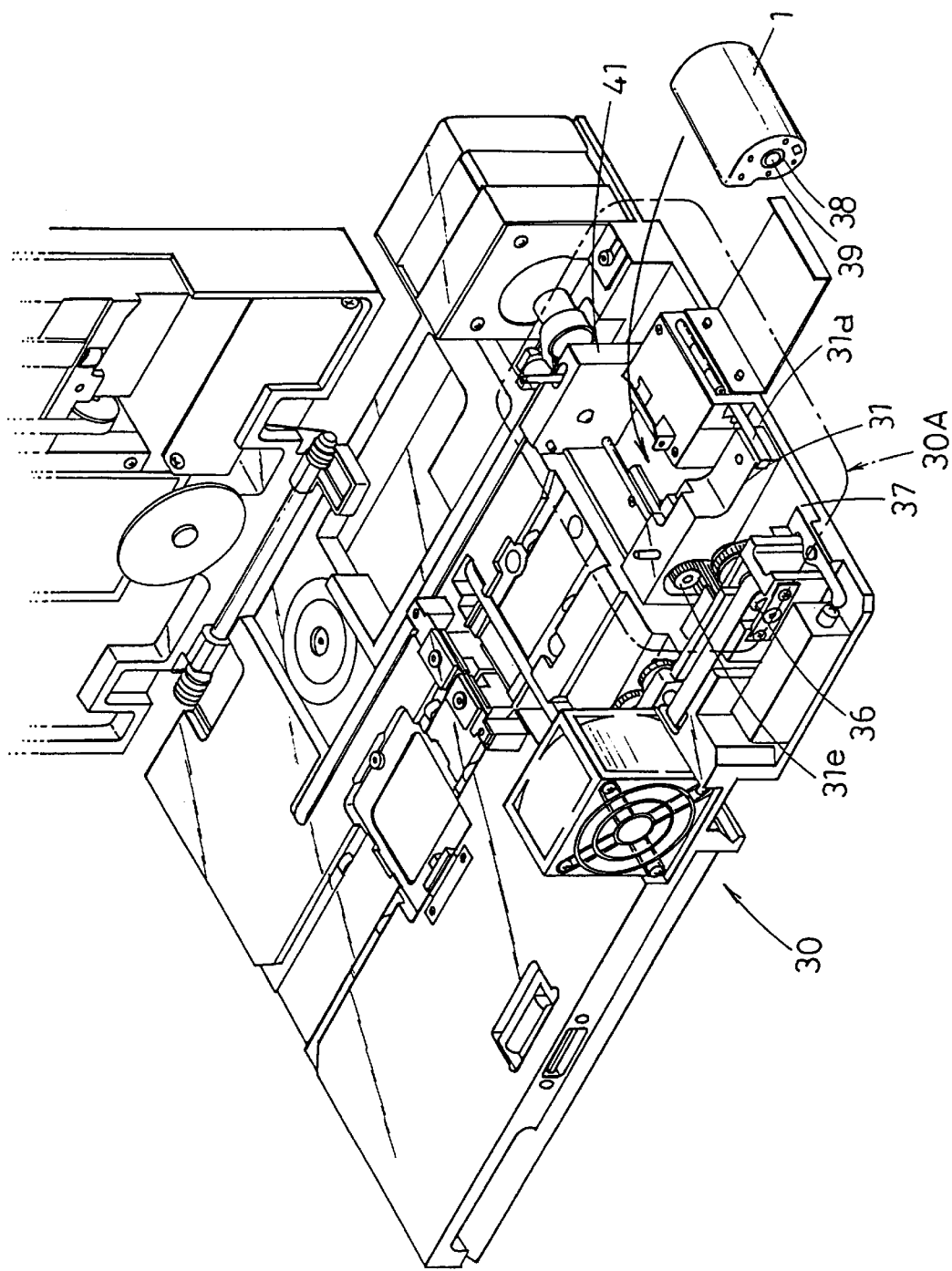
FIG. 6 is a perspective view of the automatic negative mask section illustrating another aspect of the invention.

A guide 10 guides the strip film 20A into the film slot 3. The guide is provided at opposite lengthwise ends thereof with front and rear folded portions 10b, 10c and includes a guide body 10a, on an outer surface side of which is a flat and smooth guide surface 10d for sliding thereon the strip film 20A (FIG. 3). The guide 10 is connected to an outside wall 7a of the cartridge setting unit 7 by a hinge 11. When the guide 10 is folded down toward the cartridge setting unit 7, the front folded portion 10b of the guide 10 is brought into engagement with a stepped portion 7b of the cartridge setting unit 7. Thereby, the cartridge setting unit 7 is covered with the guide 10 and a front end portion of the guide surface 10d of the guide 10 is brought into continuation to a lower edge of the film insertion slot 3 (FIGS. 2 and 3). On the other hand, when the guide 10 is raised and folded down toward the front, the cartridge setting unit 7 is exposed so that the cartridge 1 can be set in the cartridge setting unit 7 (FIGS. 1, 4 and 5).

Operation of the negative mask section 30 when the strip film 20A is guided into the film insertion slot 3 by the guide 10 will be described below.

(1) First, the front end of the strip film 20A is inserted into the film insertion slot 3 along the guide surface 10d of the guide 10, as shown in FIGS. 2 and 3.

(2) When the front end of the strip film 20A is detected by the sensor S, a carriage motor 22 is driven to force the strip film 20A to be successively advanced from the film insertion slot 3 toward the film ejection slot 4, during which information on a photographic image of each frame of the strip film is scanned.

(3) After completion of such scanning, the strip film 20A is fed back from the film ejection slot 4 toward the film insertion slot 3.

(4) Then, the strip film 20A is intermittently advanced frame by frame so that a photographic image of the frame positioned at the negative mask 6 is printed on a photographic paper.

(5) After the last frame of the strip film 20A is printed, the strip film 20A is discharged from the film ejection slot 4.

Operation of the negative mask section 30 when the cartridge 1 containing therein the film 20 is set in the cartridge setting unit 7 will be described below.

(1) A front end of the film 20 pulled out from the cartridge 1 by the thrust mechanism 8 is inserted into the film insertion slot 3. As will be apparent from FIG. 5, the film is drawn out from the cartridge 1 at a level and in an angular orientation such that film 20 is directed in a straight or rectilinear path into film slot 3. Such path is at the same level and angular alignment as provided by surface 10d of guide 10 guiding film 20A to slot 3.

(2) When the front end of the film 20 is detected by the sensor S, the carriage motor 22 is driven to force the film 20 to be successively advanced from the film insertion slot 3 toward the film ejection slot 4, during which information on a photographic image of each frame of the film is scanned.

(3) After completion of such scanning, the film 20 is fed back from the film ejection slot 4 toward the film insertion slot 3.

(4) Then, the film 20 is intermittently advanced frame by frame so that a photographic image of the frame positioned at the negative mask 6 is printed on a photographic paper.

(5) After the last frame of the film 20 is printed, the film 20 is fed back again so that it can be taken up in the cartridge 1 by the thrust mechanism 8.

Thus, in a process involving the strip film 20A, the need of the feedback operation to rewind film into the cartridge can be eliminated, compared to the process involving the film 20 contained in the cartridge 1. Thus, the number of movements of the film is minimized or reduced to reduce the risk of damage to films.

It is noted that the guide 10 may be connected to the cartridge setting unit 7 by suitable clamps other than the hinge 11.

Embodiment 2

Next, a photograph processing device, which comprises a film holder for the automatic negative mask section 30 having holding blocks which are movable toward and away from each other, will be described with reference to FIGS. 6–10.

As illustrated, a cartridge holder 30A provided in the automatic negative mask section 30 comprises a pair of holding blocks 31, 41 for holding the cartridge 1, a pair of racks 31a, 41a provided at respective holding blocks 31, 41, a pinion 35 engaged with both racks 31a, 41a, and a driving device 36 for driving a retaining shaft 31 provided at one holding block 31. More specifically, the holding blocks 31, 41 are mounted on a base plate 37 of the automatic negative mask section 30 in a horizontally moveable manner. Blocks 31, 41 are spaced at an interval greater than a lengthwise dimension of the cartridge 1 and confront each other. The holding blocks 31, 41 have surfaces which are in contact with the base plate 37 and which are different in length from each other. One holding block 31 is longer than the other holding block 41. Accordingly, when ends of the holding blocks 31, 41 are arrayed in a line, the blocks extend different lengths from such ends (vertically as viewed in FIG. 7). The holding blocks 31, 41 having different lengths are provided at the other ends thereof with the racks 31a, 41a which extend horizontally as viewed in FIG. 7 toward the opposite holding blocks 31, 41. The racks 31a, 41a are associated with each other via the pinion 35 engaged with the racks so that horizontal movement of the one holding block 31 can cause horizontal movement of the other holding block 41 via the pinion 35. The holding blocks 31, 41 can be moved horizontally in the opposite directions.

Retaining shafts 31b, 41b are located at positions such that they come to engage with engaging holes 39 at spool axis 38 of he cartridge 1. Shafts 31b, 41b project from the holding blocks 31, 41 at confronting sides thereof (see FIGS. 6 and 7).

Figure 7:
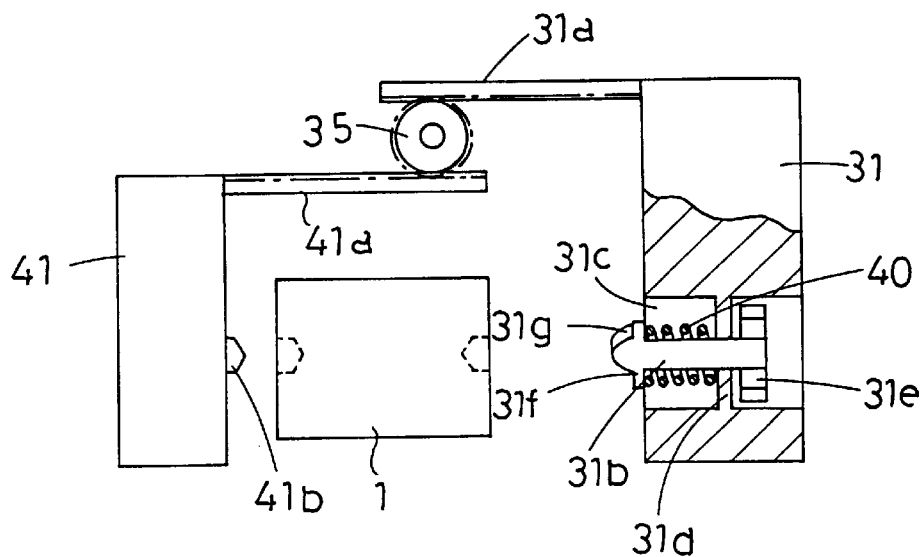
FIG. 7 is a partially sectional illustration view of a cartridge holder of the invention.
Figure 8:
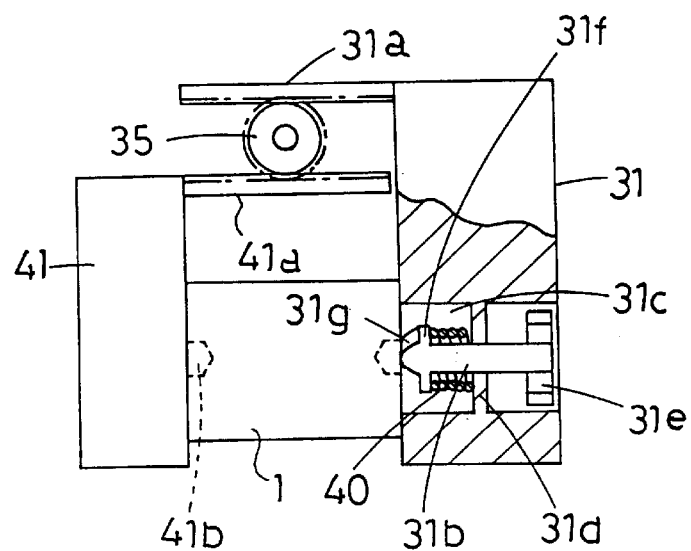
FIG. 8 is an illustration showing a state in which a key at a retaining shaft on a driving side is not in engagement with a key slot of a cartridge.
Figure 9:
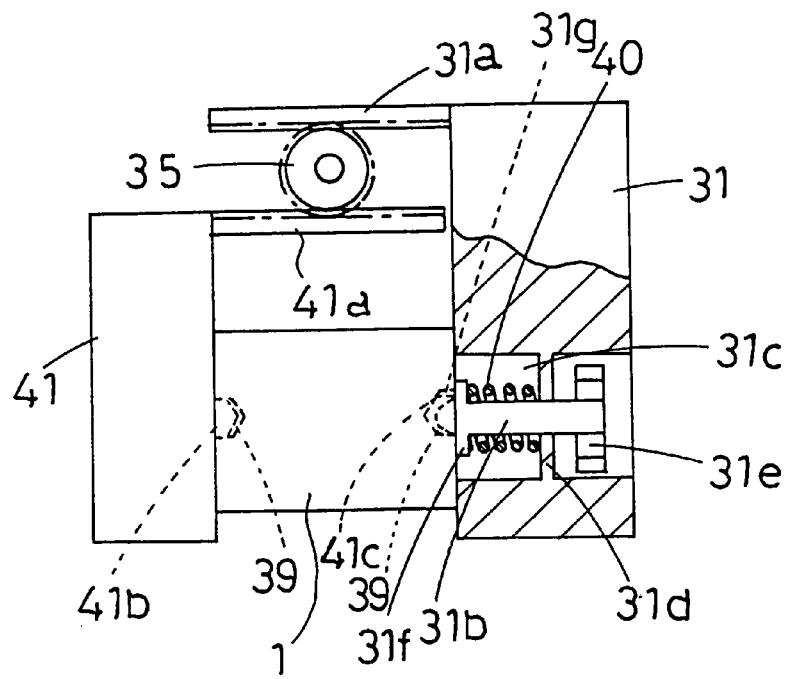
FIG. 9 is an illustration view showing a state in which the key at the retaining shaft on the driving side is in engagement with the key slot of the cartridge.

One retaining shaft 31b at the one holding block 31 extends through a supporting portion 31d in an opening 31c formed in the holding block 31 and is supported by the support portion 31d to be freely rotatable. The retaining shaft 31b is provided at the rear end thereof with a gear 31e which is engageable with driving device 36 to rotate the retaining shaft 31b. The retaining shaft 31b is provided, at a part thereof close to the front end, with a flange 31f. A spring 40 is interposed between the flange 31f and the support portion 31d so that spring 40 always resiliently biases the shaft 31b toward the other holding block 41, as shown in FIG. 7. Further, the retaining shaft 31b is provided at the front end portion thereof with a key 31g. The key 31g is so formed as to match with a key slot 41c (see FIG. 9) formed in the engaging hole 39 at the spool axis 38 of the cartridge 1.

During use of the cartridge holder 30A having this construction, the cartridge 1 is set in place between the holding blocks 31, 41. By moving the one holding block 31 horizontally toward the other holding block 41, the other holding block 41 is moved horizontally via the rack 31a of the one holding block 31, the pinion 35 and the rack 41a of the other holding block 41, so that the two holding blocks 31, 41 are moved toward each other.

This causes the retaining shaft 41b at the other holding block 41 to be engaged into the engaging hole 39 at one end of the spool axis 38 of the cartridge 1, and also the tip of the retaining shaft 31b at the one holding block 31 to be engaged into the engaging hole 39 at the other end of the spool axis 38. During this movement, if the key 31g of the retaining shaft 31b does not fit into the key slot 41c formed in the engaging hole 39 of the spool axis 38, the retaining shaft 31b is moved back into the holding block 31 against the force of the spring 40. Until after the key 31g is fit into the key slot 41c formed in the engaging hole 39 of the spool axis 38, rotation the retaining shaft 31b by the driving device 36 is not transmitted to the spool axis 38. In this way, the cartridge 1 is held by both holding blocks 31, 41 and the spool axis 38 is rotated to feed the film wound on the spool axis 38 from the cartridge.

When the cartridge 1 is removed, the one holding block 31 is moved back to cause the other holding block 41 to horizontally move away from the cartridge 1 via the pinion 35. As a result, the retaining shafts 31b, 41b at the holding blocks 31, 41 are disengaged from the engaging holes 39 at the cartridge 1 and a space large enough for the cartridge 1 to be easily removed is produced at the location of the cartridge 1.

Figure 10:
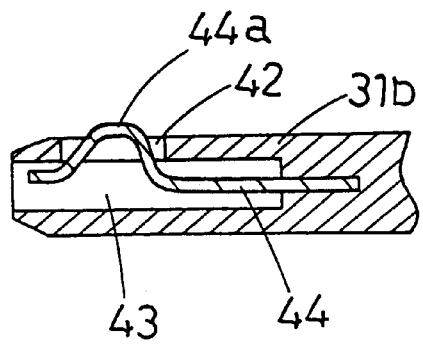
FIG. 10 is a partial sectional view of a modified retaining shaft.

FIG. 10 shows a variant of the retaining shaft 31b at the driving side thereof. This modified retaining shaft 31b is provided with an inner channel or recess 43 which communicates with an opening 42 formed on a circumferential part of the retaining shaft 31b close to the front end thereof. A resilient projection member 44 is fittingly provided in the inner channel 43. The resilient projection member 44 is formed by a rod-like member being folded. A retaining projection 44a of the resilient projection member 44 normally projects from the opening 42.

In use of this variant retaining shaft 31b, after the cartridge 1 is set in a space between the two holding blocks 31, 41 spaced apart from each other, the holding blocks 31, 41 are moved closer to each other. Thus, the front end of the retaining shaft 31b is inserted in the engaging hole 39 at the spool axis 38 of the cartridge 1, as in the case of the above embodiment. When the retaining projection 44a of the resilient projection member 44 is brought into engagement with the key slot 41c in the engaging hole 39, rotation of the retaining shaft 31b driven by the driving device 6 is transmitted to the spool axis 38 of the cartridge 1.

Embodiment 3

Next, a rotary driving device for a cartridge I having the function of indicating a state of film (unexposed, exposed, developed or the like) packed in the cartridge will be described with reference to FIGS. 11–14.

Figure 11:
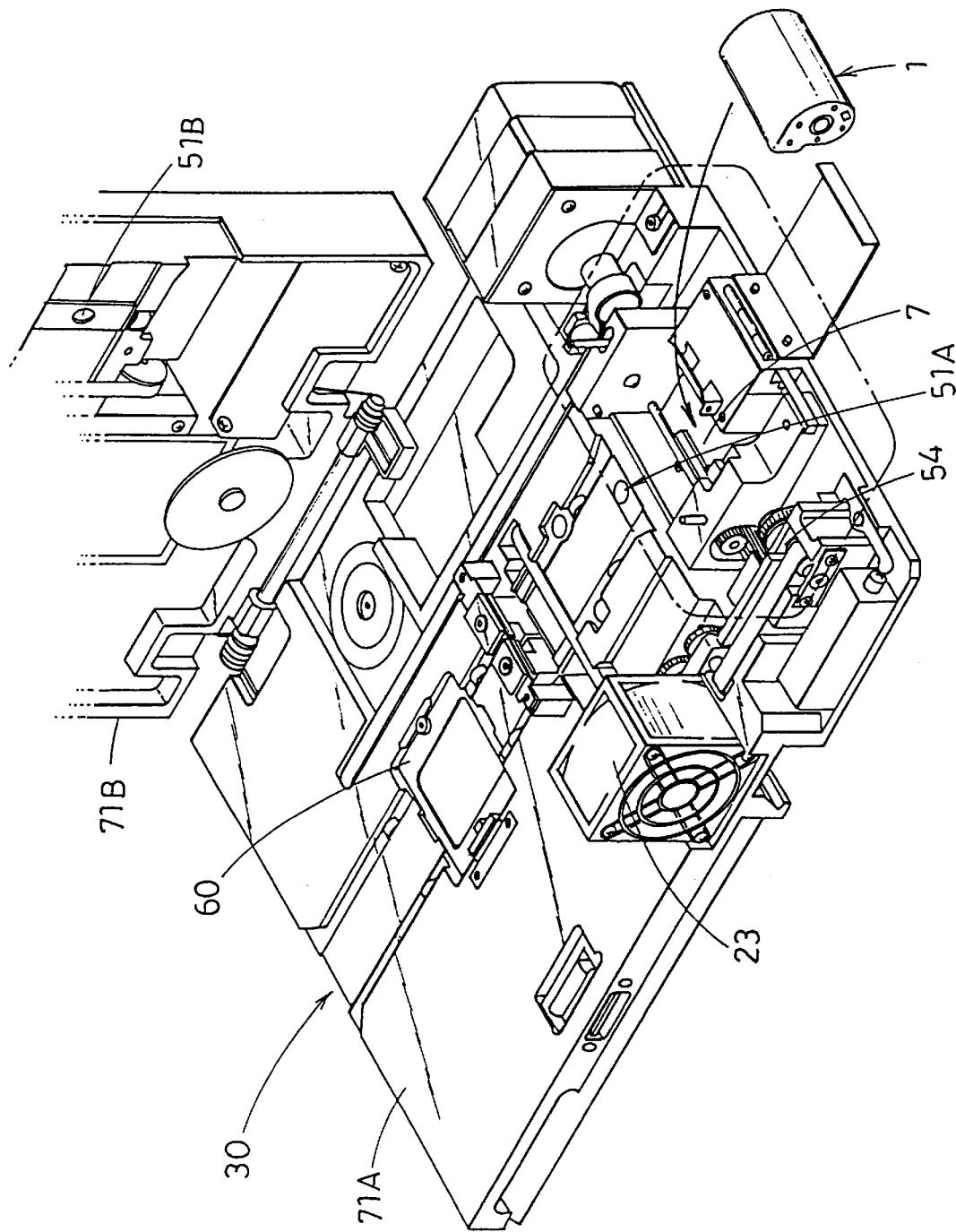
FIG. 11 is a perspective view showing a main part of the photograph processing device illustrating a rotary driving device for a cartridge of the invention.

FIG. 11 is a perspective view of the automatic negative mask section 30 of the photograph processing device having the rotary driving device of the invention.

Cartridge 1 containing therein film is placed in cartridge setting unit 7. A rotary driving means 54 is inserted into spool 38 of the cartridge 1 to rotatively drive the spool by driving motor 23. A detecting means for detecting the front end of the film comprises a light emitting element 51A and a light-receptive element 51B. A negative mask 60 is located along the carriage path of the film. The automatic negative mask section 30 comprises a stationary member 71A and an openable and closeable member 71B.

Figure 12:
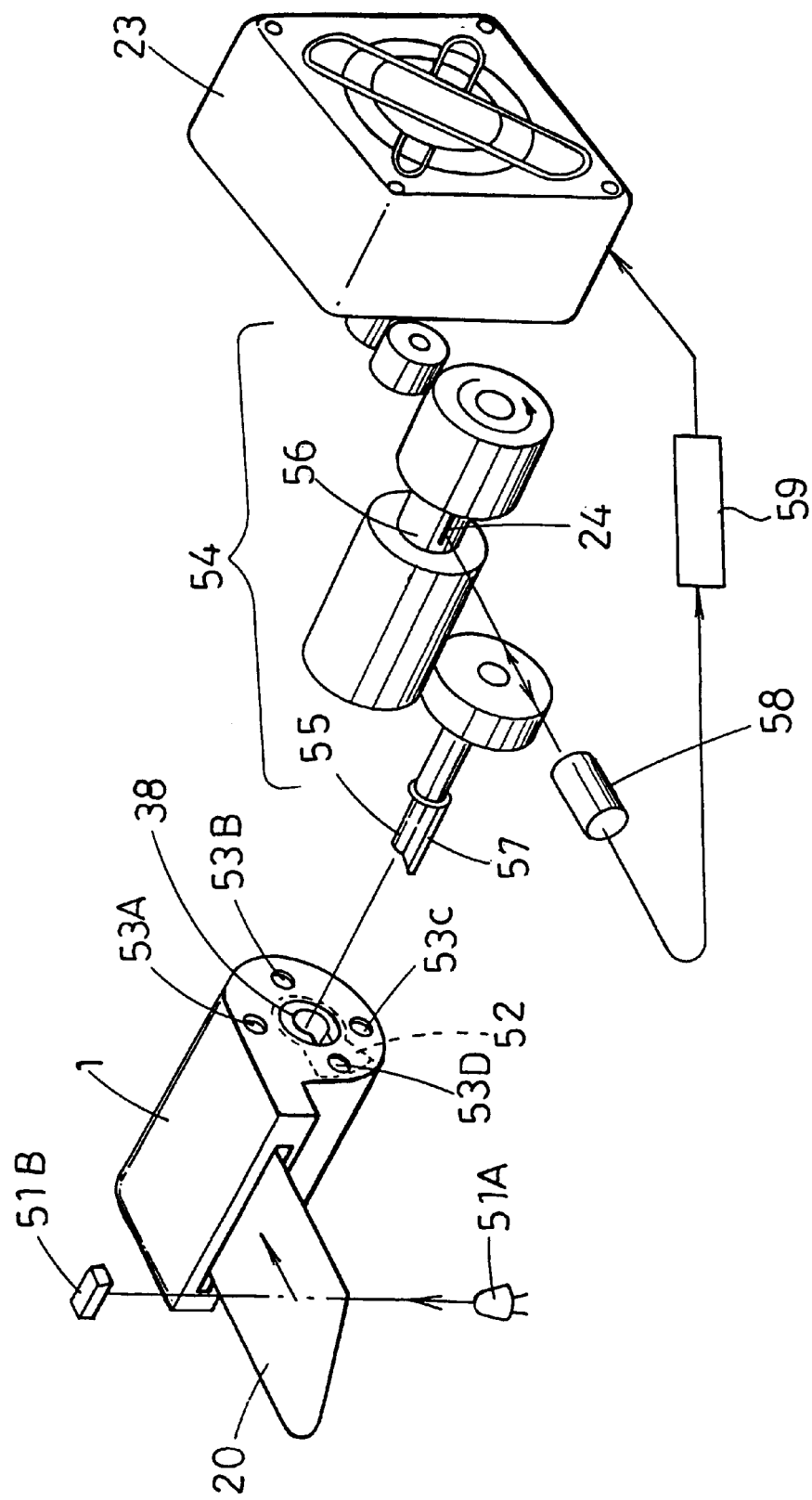
FIG. 12 is an exploded perspective view showing a structure of the rotary driving device for the cartridge in the photograph processing device.
Figure 15:
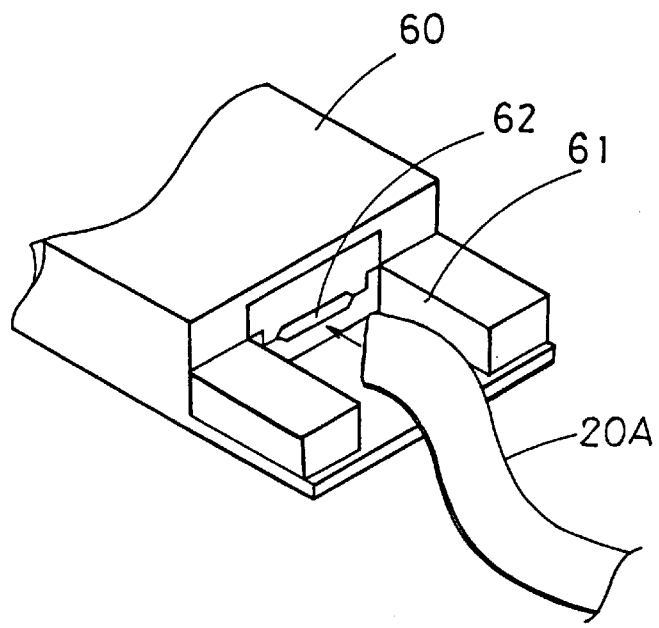
FIG. 15 is an illustration showing a prior art arrangement.
Figure 16:
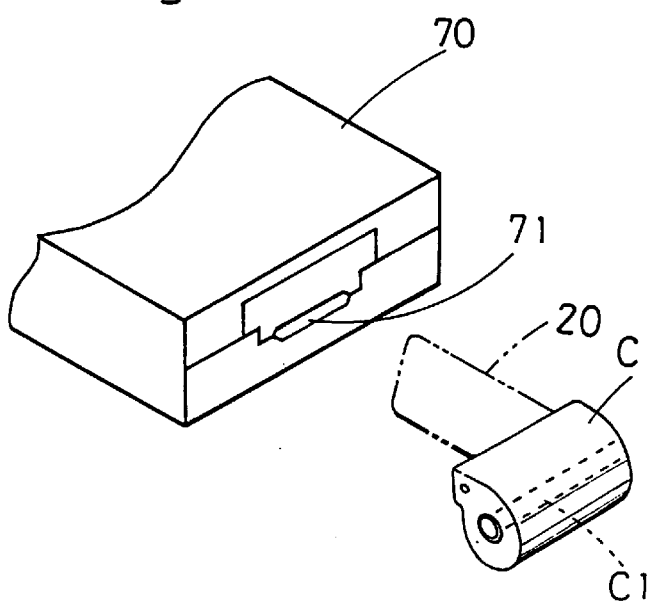
FIG. 16 is an illustration showing another prior art arrangement.

As shown in FIG. 12, indication windows 53A, 53B, 53C, 53D are formed in a side wall of the cartridge 1, and a colored indication plate 52 (FIG. 13) which is rotatable together with the spool 38 is installed at the inside of the side wall. When the indication plate 52 is stopped at any one indication window 53A, 53B, 53C, or 53D, only the related indication window turns the color of the indication plate 52. Each indication window is so arranged as to indicate a respective state or condition of the cartridge. For example, where the indication plate 52 is placed at the indication window 53A, such position indicates that the film in the cartridge is in the condition of "unexposed", while the remaining indication windows 53B, 53C and 53D indicate "half-exposed", "completely exposed but not-yet-developed" and "already-developed", respectively.

A driving shaft 55 of the rotary driving section 54 is provided with a key 57, so that, when the driving shaft 55 is inserted into the spool 38, it is rotatively driven without slippage, with the key fit into the key slot of the spool. A shaft 56 of a rotary transmission mechanism of the rotary driving section 54 is set to rotate at the same speed as the driving shaft 55. An optical mark 24 is attached to a circumferential part of the shaft 56. It should be noted that the mark 24 may be attached to any shaft which can rotate at the same revolution speed as the driving shaft 55. Also, any form of the mark 24 is satisfactory as long as it is optically distinguishable. For example, the shaft may have such a form as shown in FIG. 14(a), with a flat, mirror-smooth reflecting region formed on only a part of the shaft, while a black, curved, non-reflectable region is formed on the remaining circumferential part of the shaft.

The mark 24 is attached to the shaft 56 at the same angular position as the key 57 at the driving shaft 55, which means that the position of the mark 24 indicates the position of the key 57. Further, a key slot 60 is formed in the indication plate 52 in the cartridge at the same angular position as the key slot in the spool 38 and is in alignment with a center axis of an indication surface 61. With this structure, the position of the indication surface 61 can be derived from the position of the mark 24.

A reflector type optical sensor 58 which is located in a horizontal position relative to the shaft 56 so that a detection signal can be output when the mark 24 comes to be in the horizontal position as illustrated. Thus, when the indication surface 61 of the indication plate 52 comes to be in the horizontal position in which the color of the indication surface 61 can be viewed from the indication window 53D, the mark 24 is detected by the optical sensor 58 and the detection signal output from the optical sensor 58 is entered into a control circuit 59. The control circuit 59 is operate to stop the driving motor 23 immediately after the detection signal is received by the control circuit. In other words, when the cartridge is removed from the photograph processing device after the film is rewound in the cartridge, the indication plate 52 come to a standstill precisely in the horizontal position in which the color of the indication surface 61 can be seen only from the indication window 53D to indicate that the cartridge 1 is in the "already-exposed" state.

In such photograph processing device, when the cartridge 1 is set in the cartridge setting unit 7, the aperture is opened and the driving shaft 56 of the rotary driving section 54 is inserted in the spool 38 of the cartridge 1. When the key 57 at the driving shaft 55 is meshed with the key slot at the spool 38 and the driving motor 23 rotates in the normal direction, the film is fed from the cartridge 1. Specified frames of the film fed from the cartridge are masked in a prescribed manner and then are printed on a photographic paper. After completion of printing of all the specified frames, the driving motor 23 rotates in the reverse direction to start to rewind the film. When light from the light emitting element 51A, previously intercepted by the film 20, reaches the light-receptive element 51B, this is an indication that the film is near to completion of rewinding thereof. From this point, the spool is turned further by a predetermined angle (e.g., a half-turn which is an angle enough for the film to be entirely rewound in the cartridge 1), and then positioning control of the indication plate 52 is started. During such positioning control, the driving motor 23 is rotated, and the optical sensor 58 detects the mark 24. Immediately after a detection signal is output, the driving motor is stopped. Then, the driving shaft 55 is pulled out from the spool 38 to remove the cartridge 1. The cartridge 1 is removed and is in a condition that the color of the indication surface 61 can be seen only from the indication window 53D to indicate that the cartridge I has already been developed.

The mark may have such a form as shown in FIG. 14(b), i.e. with a reflecting region 24A forming the mark, while a black, non-reflectable region is formed on the remaining circumferential part of the shaft.

Alternatively, instead of a reflecting type optical sensor, a light intercepting disc may be used which comprises a light-permeable optical sensor (a photo interrupter) 58A and a slit-24B formed only in a mark position.

Further, during positioning control, when the mark 24 is detected by the optical sensor 58, the driving motor 4 may be switched to a low r.p.m. operation for the time being, rather than being stopped immediately, in order to ensure a further accurate positioning.

Further, it should be noted that the mark to be attached to the shaft 56 is not necessarily limited to a single optical mark but may alternatively adopt various known marking methods. In addition, the indication plate 52 may be inconsistent with the mark in orientation, provided that a relative relationship between the indication plate 52 and the optical sensor 58 is maintained invariant. For example, a method of providing a magnetic mark and detecting it by a magnetic sensor, a method of providing a mark having an irregular form or the like and mechanically detecting it, a method of providing a conductive means and a non-conductive means for electric detection, etc., are practical. Further, the color of the indication plate may be detected by directly monitoring the indication windows in an optical manner, in place of detecting the mark in the rotary driving section 54.

It should be noted further that since the above description is of a printing process as an example, the stopping position of the indication plate is limited to the indication window 53D. If the cartridge in which unexposed frames remain is processed, the stopping position of the indication plate must be aligned with the indication window 53B. For this alignment, various methods as mentioned above may be adopted to enable detection of various orientations of the indication plate at four positions displaced from each other by 90 degrees. The indication plate may be stopped precisely at any desired indication window in this way, so that possible risks, for example, a possible risk of an already-exposed cartridge being developed again by mistake or being inserted in a camera by mistake to take exposures again, can be avoided.

It is noted that the device of the invention can be employed not only with the automatic negative mask section 30, but also to various types of photograph processing devices for managing a film by the cartridge.

What is claimed is:

1. A photographic processing device including an automatic mask section comprising:

a film slot;

a cartridge setting unit for receiving a cartridge having a film therein, said cartridge setting unit being located at a position such that when the cartridge is received therein the film may be withdrawn from the cartridge at a level and in an angular direction directly aligned with said film slot then and introduced into said film slot; and a guide detachably mounted relative to said cartridge setting unit to enable guiding of a strip film at said level and in said angular direction into said film slot.

2. A device as claimed in claim 1, wherein said guide is mounted on said cartridge setting unit.

3. A device as claimed in claim 1, wherein said guide is pivotally mounted on said cartridge setting unit.

4. A device as claimed in claim 1, wherein said guide is mounted on said cartridge setting unit by a hinge.

5. A device as claimed in claim 1, wherein said guide is mounted for pivotal movement from an operative position enabling guiding of a strip film into said film slot to an inoperative position wherein a strip film may not be guided into said film slot.

6. A device as claimed in claim 5, wherein said guide covers said cartridge setting unit in said operative position thereby preventing positioning of a cartridge therein, and said guide uncovers said cartridge setting unit in said inoperative position thereby enabling positioning of a cartridge therein.

7. A photographic processing device including a film holder for holding a cartridge having therein film on a spool, said film holder comprising:

two holding blocks mounted at positions to be on opposite sides of a cartridge to be positioned between said holding blocks;

each said holding block having a rack gear extending in a direction toward the other said holding block;

a pinion engaging said racks of said holding blocks, such that movement of one said holding block in a first direction causes movement of the other said holding block in an opposite second direction, whereby said holding blocks are movable toward and away from each other; and said holding blocks having respective retaining shafts at positions to be engageable with engaging holes of the spool of the cartridge when the holding blocks are moved toward each other, whereby the cartridge can be retained in position by said retaining shafts.

8. A device as claimed in claim 7, wherein one said retaining shaft is mounted at the respective said holding block thereof to be freely rotatable, is biased toward the other said retaining shaft by a spring, has a front end portion having a key to be engageable in a key slot in an engaging hole of the spool of the cartridge, and is driven by driving means.

9. A device as claimed in claim 8, wherein said one retaining shaft driven by said driving means has an inner channel communicating with an opening formed in a circumferential part of said one retaining shaft adjacent a front end thereof, and a resilient projection member positioned in said inner channel and having a retaining projection extending through said opening for engagement in the key slot.

10. A rotary driving device for rotating a cartridge spool having film thereon and having an indication plate rotatable therewith to selected angular positions indicative of respective conditions of the film, said rotary driving device comprising:

a driving shaft to be inserted into the spool;

rotary driving means for rotating said driving shaft in opposite directions to thereby enable the spool to be rotated in opposite directions to unwind film from and wind the film on the spool;

position detecting means for detecting an angular position of said driving shaft to be indicative of a selected angular position of the indication plate and for outputting a signal representative thereof, said position detecting means comprising an optically detectable mark on said driving shaft, and an optical sensor for detecting a position of said mark; and control means, responsive to said signal, for controlling said rotary driving means to stop rotation of said driving shaft at a position whereat the indication plate will be stopped at the selected angular position.

11. A device as claimed in claim 10, wherein said mark is on a periphery of said driving shaft.

12. A photographic processing device including a rotary driving device for rotating a cartridge spool having film thereon, said rotary driving device comprising:

an indication plate to be fixed to the spool to be rotatable therewith to selected angular positions indicative of respective conditions of the film;

a driving shaft to be inserted into the spool;

rotary driving means for rotating said driving shaft in opposite directions to thereby enable the spool to be rotated in opposite directions to unwind film from and wind the film on the spool;

position detecting means for detecting an angular position of said driving shaft indicative of a selected angular position of said indication plate and for outputting a signal representative thereof, said position detecting means comprising an optically detectable mark on said driving shaft, and an optical sensor for detecting a position of said mark; and control means, responsive to said signal, for controlling said rotary driving means to stop rotation of said driving shaft at a position whereat said indication plate will be stopped at said selected angular position.

13. A device as claimed in claim 12, wherein said mark is on a periphery of said driving shaft.

* * * * *